A. VANDERVELD.
MOUNT FOR BELT HOOKS.
APPLICATION FILED APR. 10, 1916.
1,220,298.
Patented Mar. 27, 1917.
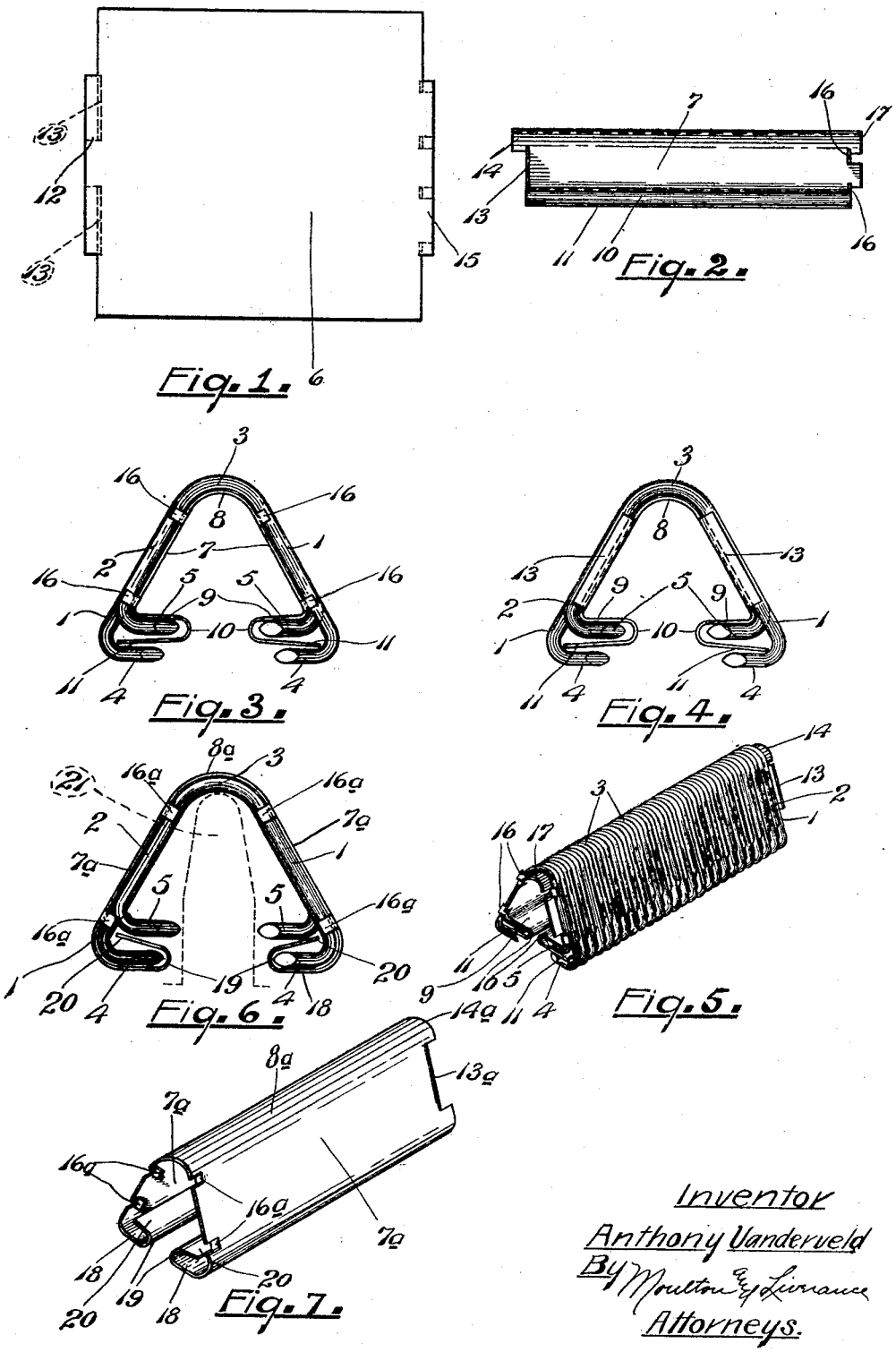
Inventor
Anthony Vanderveld
By Moulton & Lurance
Attorneys.

UNITED STATES PATENT OFFICE.

ANTHONY VANDERVELD, OF GRAND RAPIDS, MICHIGAN, ASSIGNOR TO CLIPPER BELT LACER COMPANY, A CORPORATION OF MICHIGAN.

MOUNT FOR BELT-HOOKS.

1,220,298.  Specification of Letters Patent.  Patented Mar. 27, 1917.

Application filed April 10, 1916. Serial No. 90,183.

*To all whom it may concern:*

Be it known that I, ANTHONY VANDERVELD, a citizen of the United States of America, residing at Grand Rapids, in the county of Kent and State of Michigan, have invented certain new and useful Improvements in Mounts for Belt-Hooks; and I do hereby declare the following to be a full, clear, and exact description of the invention, such as will enable others skilled in the art to which it appertains to make and use the same.

This invention relates to a mount for belt hooks or staples, it being an object and purpose thereof to provide a mount for carrying belt hooks of the well known form having diverging legs, said hooks being mounted side by side and contacting with each other whereby a very large number of the hooks may be placed on the mount to provide a package occupying relatively small space. A further object of the invention consists in the provision of a special mount for belt hooks having diverging legs of unequal length, the hooks being positioned alternately so that the long and short legs of adjacent hooks are together whereby the inwardly extending attaching prongs on said hooks occupy different planes, the mount containing means whereby said inwardly extending attaching prongs may be held in said different planes so that the bodies and legs of the hooks are insured against movement with respect to each other and to the mount when placed on the mount. A still further object of the invention consists in the provision of a mount of thin flexible material from which the hooks may be easily stripped by pulling upon one end of the mount, when the hooks are to be used in any suitable tool or machine for attaching the same to a belt.

Many other objects and purposes than those specifically enumerated together with novel constructions for attaining the same will appear as understanding is had of the preferred embodiments illustrated in the accompanying drawing, in which;

Figure 1 is a development of one form of the mount.

Fig. 2 is a side elevation thereof as it appears bent into the form that it takes when the hooks are placed thereon.

Fig. 3 is a view from one end of said mount with the hooks thereon.

Fig. 4 is a similar view from the opposite end.

Fig. 5 is a perspective view showing a plurality of belt hooks on the mount.

Fig. 6 is an end elevation similar to Fig. 3 of a slightly modified construction; and Fig. 7 is a perspective view of such modified construction.

Like reference characters refer to like parts throughout the several views of the drawing.

Belt hooks of the character used are formed of wire, each consisting of long and short legs 1 and 2 respectively which are connected by a central curved section 3, the legs diverging from each other and being provided at their ends with inwardly turned attaching prongs 4 and 5 respectively. The mount upon which these hooks are to be placed is preferably formed of thin sheet metal, the blank of metal being indicated at 6 which may be of any desired length to contain any desired number of hooks. The blank is bent longitudinally substantially along its longitudinal center line to form diverging sections 7 connected by a curved central section 8 and so formed as to fit within the belt hooks as shown in Fig. 3, each section 7 being turned inwardly to form a substantially horizontal section 9, each of which is then turned as indicated at 10 and extended outwardly and slightly downward terminating in the section 11. In practice belt hooks are placed over this mount, the first hook containing a long leg 1 and a short leg 2, being placed over the mount, the prong 5 on the short leg being received within the trough between sections 9 and 11 at one side of the mount while the opposite prong 4 on the long leg passes underneath the opposite section 11. The next hook to be placed on the mount is reversed in position so that the long leg thereof lies alongside the short leg of the hook first placed on the mount, the short leg of the second hook similarly lying alongside of the long leg of the first hook. A large number of hooks are placed on the mount in this manner, the long and short legs alternating on each side so that the prongs 5 of the short legs are all received within the troughs between sections 9 and 11 and the prongs 4 of the long legs are all positioned beneath sections 11, it being apparent that when so located legs 1 and 2 and the curved portions 3 of the hooks are held firmly against the sections 7 and 9 preventing displacement of the hooks in any manner.

The blank from which the mount is formed at one end has an extension 12 which before the hooks are placed upon the mount has parts 13 cut and turned outwardly so as to provide stops preventing the passage of the hooks over and disengagement from the mount as they are placed thereon. Each of the parts 13 is located so that the legs 1 and 2 of the first staple strike thereagainst, there being left a projection 14. Similarly at the opposite end a section 15 is formed from which after all of the staples have been placed upon the mount ears 16 may be turned to engage against the legs of the last staple, and if desired projections 17 may be left. The projections 14 and 17 are of utility for grasping by any suitable tool to strip the staples from the mount when they are to be used, it being apparent that when the end 14 is grasped and the staples held, a pulling force exerted on the end 14 will strip the staples from the mount, ears 16 bending readily to permit this.

The modification in structure shown in Figs. 6 and 7 contemplates that the staples shall be received inside the mount. The mount in this instance contains diverging sections 7ª connected by a central curved section 8ª, said sections having turned therefrom inwardly extending horizontal portions 18 which are turned back at 19 forming the sections 20 as shown in Figs. 6 and 7 whereby when the staples are received within the mount, the prongs 4 of the long legs are located in the trough between sections 18 and 20 while the prongs of the short legs of the staple come directly above the sections 20 as shown. This mount is also provided with inwardly turned stops 13ª, a projection 14ª and inwardly turned ears 16ª serving the same purpose as the stops 13 and 16 and projection 14 in the construction previously described. The stops 13ª and ears 16ª are turned inwardly instead of outwardly by reason of the fact that the staples are inside of the mount instead of outside.

With a mount of this character a large number of staples may be carried in comparatively small space and as one side of the mount is always open the combined staples and mount may be passed over any suitable way such as indicated in dotted lines at 21 in Fig. 5 on which the staples rest after stripping from said mount. It is also evident that a device of this character practically insures against the loss or waste of staples. This is a feature of considerable importance as in many of the cards now used for holding belt hooks or staples a large number are lost by reason of the ease with which they are disconnected from the cards.

I claim:—

1. In combination, a member consisting of a thin sheet of material bent longitudinally to form a curved central section and outwardly diverging sections and to leave an open side, a plurality of belt hooks or staples each having a curved central section and diverging legs positioned side by side along said member with the legs of the staples lying against the diverging sections of the member, thereby leaving said side open, and tabs turned from the ends of said member to normally prevent movement of the belt hooks or staples lengthwise of said member and separation therefrom, substantially as described.

2. In combination, a mount consisting of a thin sheet of material bent into trough-like form to provide a central section and two diverging sections and an open side therebetween, a plurality of belt hooks or staples each having diverging legs and inwardly extending prongs at the free ends of said legs, said staples being mounted on and lying against said mount and in contact engagement with each other, said prongs extending toward each other at the open side of the mount, and means to normally retain the staples on the mount, said means being operable to permit the ready removal of said staples from the mount, substantially as described.

3. In combination, a mount consisting of a thin sheet of material bent into trough-like form to provide a central section and two diverging sections, a plurality of belt hooks or staples each having diverging legs of unequal length and inwardly extending prongs at the free ends of said legs mounted on the mount with the staples located side by side and positioned so that the long and short legs of said staples alternate on each side of the mount thereby locating the prongs on all of the short legs a distance from the prongs on all of the long legs of said staples, means to retain the staples on the mount, and means on the mount entering between said separated prongs to hold them against movement toward each other and to hold the staples contacting against the mount, substantially as described.

4. In combination, a mount consisting of a thin sheet of material bent into trough-like form to provide a central section and two diverging sections, a plurality of belt hooks or staples each having diverging legs and inwardly extending attaching prongs at the ends of the legs passed over the mount with the legs of the staples lying against the outer sides of the mount with the prongs projecting toward each other beyond the edges of said sections, and means to retain the staples on the mount, substantially as described.

5. In combination, a mount consisting of a thin sheet of material bent substantially along its longitudinal center line into a trough-like form to provide diverging sections, each section having a portion bent inwardly and then outwardly to form a groove in each side of the mount adjacent the free edges of said diverging sections of said mount, a plurality of belt hooks or staples each having diverging legs of unequal length with an inwardly extending prong at the end of each leg passed over the mount with the staples located side by side and so positioned that the long and short legs of said staples alternate on each side of said mount, the prongs on the short legs entering the grooves in said sections and those on the long legs passing below the outwardly extending portion on each diverging section, and means to normally retain the staples on the mount, substantially as described.

6. A mount adapted to hold belt staples consisting of a thin sheet of material bent into trough-like form to provide a central section and two diverging sections, said diverging sections at their free edges being bent inwardly toward each other for a distance and then turned back in the opposite direction, and means at the ends of the mount to hold staples thereon.

In testimony whereof I affix my signature.

ANTHONY VANDERVELD.

Copies of this patent may be obtained for five cents each, by addressing the "Commissioner of Patents, Washington, D. C."